US009194518B2

(12) United States Patent
Chaloupka et al.

(10) Patent No.: US 9,194,518 B2
(45) Date of Patent: Nov. 24, 2015

(54) DEVICE AND METHOD FOR CONNECTING A FLUID-CONDUCTING CHANNEL TO AN ADJACENT COMPONENT

(75) Inventors: Thomas Chaloupka, Spaichingen (DE); Thomas Brandt, Spaichingen (DE)

(73) Assignee: Eugen Forschner GmbH, Spaichingen (DE)

( * ) Notice: Subject to any disclaimer, the term of this patent is extended or adjusted under 35 U.S.C. 154(b) by 0 days.

(21) Appl. No.: 13/582,804

(22) PCT Filed: Mar. 8, 2011

(86) PCT No.: PCT/EP2011/001129
§ 371 (c)(1),
(2), (4) Date: Sep. 5, 2012

(87) PCT Pub. No.: WO2011/110326
PCT Pub. Date: Sep. 15, 2011

(65) Prior Publication Data
US 2013/0009394 A1 Jan. 10, 2013

(30) Foreign Application Priority Data
Mar. 9, 2010 (DE) .................. 10-2010-010-765

(51) Int. Cl.
*F16L 33/34* (2006.01)
(52) U.S. Cl.
CPC ..................................... *F16L 33/34* (2013.01)
(58) Field of Classification Search
USPC ..................................................... 285/296.1
See application file for complete search history.

(56) References Cited

U.S. PATENT DOCUMENTS

| | | | | | |
|---|---|---|---|---|---|
| 539,112 | A | * | 5/1895 | Barrett | 285/296.1 |
| 1,463,692 | A | * | 7/1923 | Hail | 285/296.1 |
| 1,935,425 | A | * | 11/1933 | Wiggins | 285/296.1 |
| 4,137,117 | A | * | 1/1979 | Jones | 285/21.3 |
| 4,830,409 | A | * | 5/1989 | Freeman | 285/296.1 |
| 6,494,501 | B2 | * | 12/2002 | Gotoh | 285/294.1 |
| 7,594,681 | B2 | * | 9/2009 | DeCarlo | 285/294.1 |

FOREIGN PATENT DOCUMENTS

| | | |
|---|---|---|
| DE | 379 413 | 8/1923 |
| DE | 36 04 924 C1 | 2/1987 |
| EP | 0 119 520 A1 | 9/1984 |
| EP | 1 505 328 A2 | 2/2005 |
| EP | 1 721 097 B1 | 11/2006 |

(Continued)

OTHER PUBLICATIONS

International Search Report (in German with English translation) for PCT/EP2011/001129, mailed Jul. 6, 2011; ISA/EP.

*Primary Examiner* — David E Bochna
(74) *Attorney, Agent, or Firm* — Harness, Dickey & Pierce, PLC

(57) ABSTRACT

A device and a method for connecting a fluid-conducting channel to a component is provided. The channel includes at least one end having an inner cross-section, and is arranged in a sealing manner on a first part of the component. The first part is provided with a bore for conveying the fluid further, and is fixed with respect to the component. For improved connection, it is provided that the component is additionally provided with a second part surrounding the first part, and the end of the channel is arranged in a ring space formed between the first part and the second part. The end of the channel is fixed by an adhesive at least partly filling in the ring space.

15 Claims, 3 Drawing Sheets

(56) References Cited

FOREIGN PATENT DOCUMENTS

| FR | 2 642 155 | A1 | 7/1990 |
|----|-----------|----|--------|
| GB | 2228982 | A | 9/1990 |
| WO | WO-2005/080850 | A1 | 9/2005 |

\* cited by examiner

DEVICE AND METHOD FOR CONNECTING A FLUID-CONDUCTING CHANNEL TO AN ADJACENT COMPONENT

CROSS-REFERENCE TO RELATED APPLICATIONS

This application is a 371 U.S. National Stage of International Application No. PCT/EP2011/001129, filed on Mar. 8, 2011, and claims priority to German Patent Application No. 10 2010 010 765.4, filed on Mar. 9, 2010, the disclosures of which are herein incorporated by reference in their entirety.

FIELD

The invention relates to a device and a method for connecting a fluid-conducting channel to an adjacent component in accordance with the preamble of patent claim 1 with respect to the device and patent claim 13 with respect to the method.

BACKGROUND

EP 1 505 328 A2 discloses a coupling for connecting channels in accordance with the preamble of claim 1, wherein an end of the hose is inserted into a ring space filled with an adhesive. In this case, the insertion depth is not defined and, consequently, the adhesive spills in an uncontrolled manner over the shorter outer wall of the ring space outward. An undefined insertion depth and resultant overspill of the adhesive inward are also disadvantageous in the case of the hose branching in accordance with DE 36 04 924 A1.

DE 379 413 A discloses a generic device wherein an end of a tube is inserted into an extended sleeve of an adjacent tube and they are connected to one another by an adhesive introduced into a ring gap formed between the two tubes in the region of the sleeve. The effective connection area of the adhesive is limited to the outer side of the tube having the smaller diameter.

EP 1 721 097 B1 discloses a device wherein the connection between a connector connected to an end of a hose and an outer sheathing is produced by means of a sealing element pushed onto the shaft of the connector, wherein the sealing element has a ring groove which runs in a radial direction and into which engages an inwardly projecting shoulder on the sheathing. Since the shaft of the connector typically has a toothing for better fixing of the pushed-on hose, tight bearing of the sealing element against the shaft is made more difficult. The sealing element, which with its ring groove produces the connection profile for the sheathing, is a separate component that increases production and assembly costs.

What is furthermore disadvantageous is that the sealing element is fixed on the relatively thin-walled shaft of the connector, as a result of which the fixing stability overall is very low. Furthermore, the sealing element requires a relatively large amount of structural space in an axial direction.

SUMMARY

The invention is based on the object of providing a device and a method for connecting a fluid-conducting channel to an adjacent component which enables the connection to be realized more simply and more stably.

This object is achieved by means of the features of patent claim 1 with respect to the device and by means of the features of patent claim 13 with respect to the method. Advantageous configurations of the invention can be gathered from the respective dependent claims.

The invention is distinguished by the fact that the component is additionally provided with a second part surrounding the first part, and the end of the channel is arranged in a ring space formed between the first part and the second part and is fixed by means of an adhesive at least partly filling the ring space. By embedding the end of the channel between the first and second parts, the channel is held by the adhesive at its inner side and at its outer side.

In accordance with one advantageous embodiment it is provided that the channel forms together with the first part a very narrow ring gap. The latter is preferably realized by the inner diameter of the channel and the outer diameter of the first part forming a press fit. The liquid adhesive penetrates into the resultant ring gap only in a very thin layer and the axial advance into the ring gap is limited on account of the relatively rapid curing of the thin layer of adhesive.

In accordance with a further preferred embodiment it is provided that the channel forms together with the second part a wide ring gap, which has a significantly greater extent than the ring gap between the channel and the first part mentioned in the previous paragraph.

In accordance with one particularly preferred embodiment of the invention it is provided that the first part has a shorter axial length than the axial length of the second part. In conjunction with the dimensions of the ring gaps and the viscosity of the adhesive used, what is thereby achieved is that the adhesive boundary both in the first inner ring gap and in the second outer ring gap remains within the component and no adhesive emerges into the interior of the channel or outward beyond the second part onto the sheath of the channel.

In accordance with a further advantageous embodiment it is provided that the ring space has a base, and that a chamfer widening toward the base is formed on the first part, said chamfer forming a stop, spaced apart from the base, for the end of the channel. This ensures that the end side of the channel which faces the component is spaced apart from the base of the ring space and is thereby likewise surrounded by the adhesive. Instead of the chamfer, one or more projections directed from the base of the ring space toward the end of the channel can also serve as a stop or spacer between the end of the channel and the base of the ring space.

It is furthermore particularly advantageous if the channel is formed by a flexible hose and the component is formed by a connector serving for connection to at least one adjacent component. The hose is preferably embodied in multilayered fashion, wherein one of the layers is preferably formed by a reinforcing fabric embedded directly into the adhesive at the end side of the hose facing the base.

In a first variant, the adjacent component likewise has a fluid-conducting passage. In accordance with a further variant, the component can form a permanent closure or closure that is controllable in the manner of a valve for the channel. In accordance with a further variant, which is possible separately or in combination, the adjacent component can also be formed by a sheathing surrounding the channel. The sheathing preferably engages by a shaped part into a groove on a connecting part integrally formed or separately formed and fixed on the component.

A method according to the invention for connecting a fluid-conducting channel to a component, wherein the channel, at at least one end having an inner cross section, is arranged in a sealing manner on a first part of the component, said first part being provided with a bore for conveying the fluid further, and is fixed with respect to said component, is distinguished by the fact that the component is additionally provided with a second part surrounding the first part, and the end of the channel is inserted into a ring space formed between the first part and the second part, said ring space being at least partly filled with liquid adhesive, and is fixed in the inserted position by the curing of the adhesive.

It is preferred in this case for the channel to be pushed onto the first part with a press fit, wherein the adhesive enters into the narrow ring gap between the channel and the first part only to an extent such that it does not come into contact with the inner cross section of the channel beyond the end of the first part.

It is furthermore preferred for carrying out the method for the end of the channel to be arranged in a manner spaced apart from a base arranged in the ring space between the first part and the second part, such that the end side of the channel that faces the base is concomitantly surrounded by the adhesive.

DRAWINGS

A device according to the invention is explained in greater detail below on the basis of a number of exemplary embodiments with reference to the drawing, in which.

DETAILED DESCRIPTION

Figure 1:
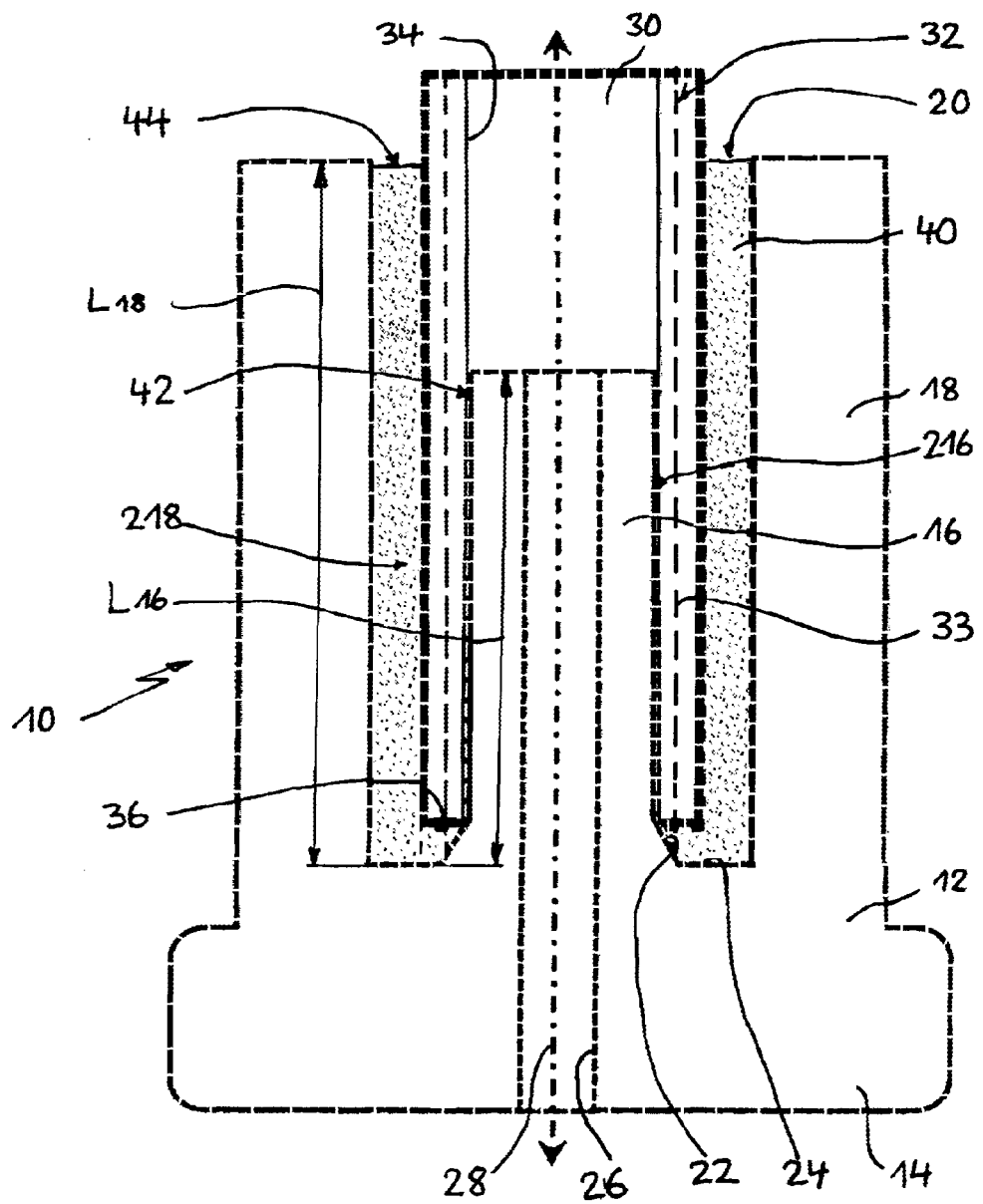
FIG. 1 shows a longitudinal section through a first embodiment of a device.

A device—designated in its entirety by 10—for connecting a fluid-conducting channel 30 to a component 12 is illustrated in a first embodiment in FIG. 1. In this case, the fluid-conducting channel 30 is formed by a hose 30, the inner passage 34 of which is bounded by a wall 32. The wall 32 is preferably embodied in multilayered fashion, wherein one of the layers is preferably formed by a reinforcing fabric 33. An inner layer of the wall 32 is produced from a material resistant to the fluid conducted in the interior of the hose 30.

Figure 2:
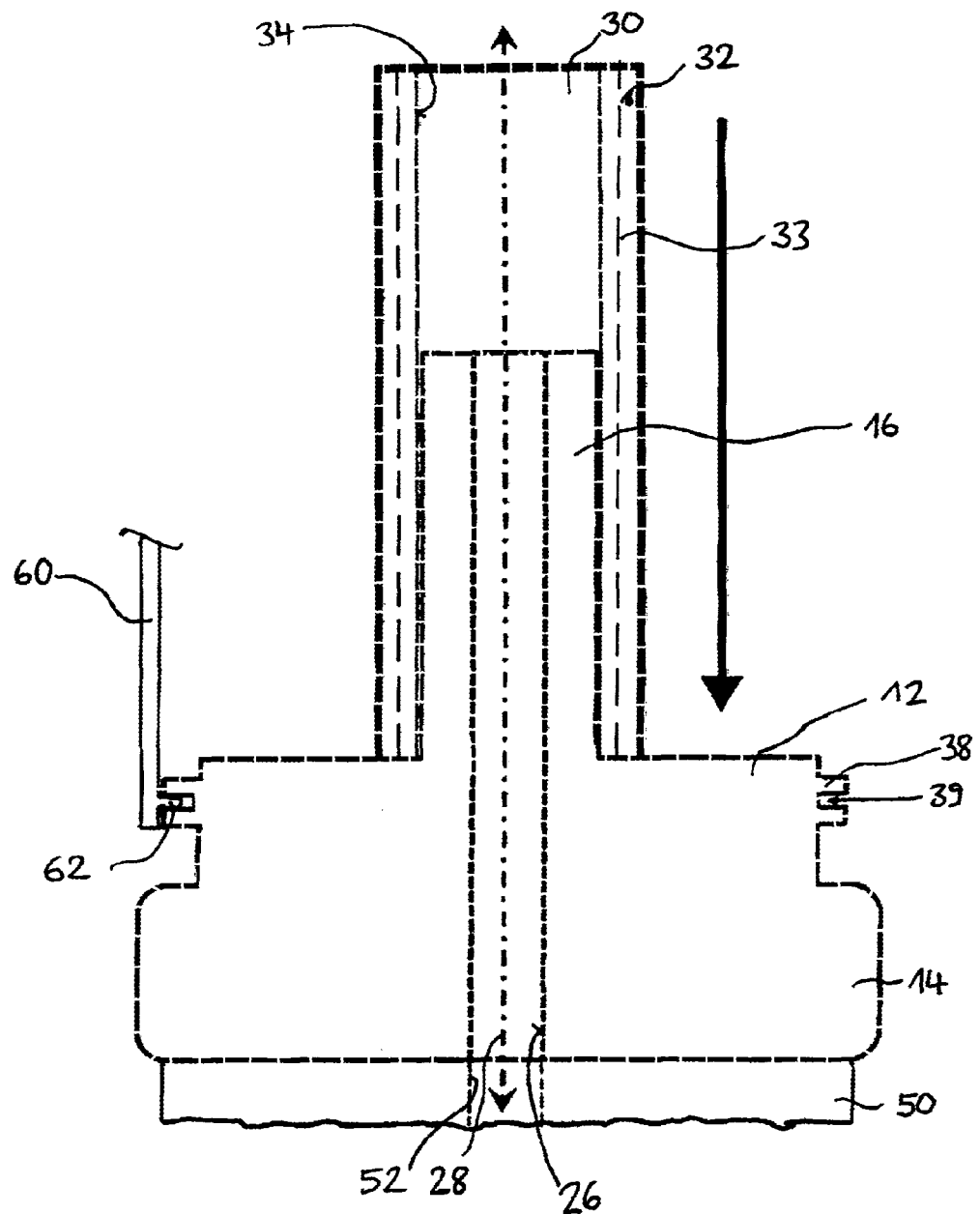
FIG. 2 shows a longitudinal section through a second embodiment of a device with a connecting part integrally formed on the connector.
Figure 3:
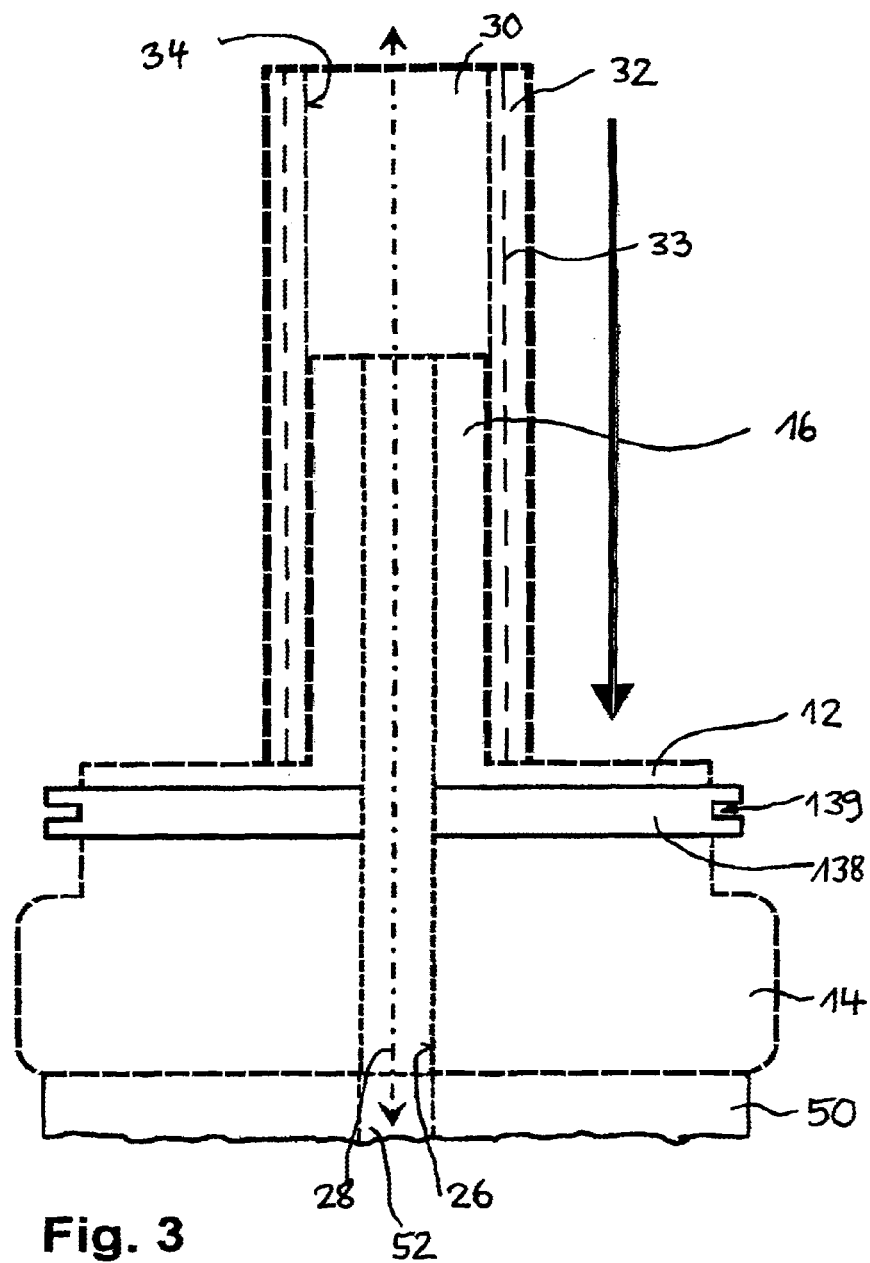
FIG. 3 shows a longitudinal section through a third embodiment of a device with a connecting part formed separately and arranged on the connector.

The component 12 is embodied as a connector 12, which produces the connection between an end of the hose 30 and at least one adjacent component. For this purpose, the connector 12, in its part situated at the bottom in FIGS. 1 to 3, is provided with a connection piece 14 serving for connection to the adjacent component 50 (see FIGS. 2 and 3), which preferably has a bore 52. The details of the connection of the connection piece to the adjacent component 50 are not part of the subject matter of this invention and have therefore been omitted in the figures.

In the variant illustrated in FIG. 1, the connector 12 has, on its side facing the end of the hose 30, a tubular first part, which is embodied as an inner collar 16 and which surrounds a bore 26 penetrating through the entire component 12 in a longitudinal direction. The first part embodied as an inner collar is surrounded at a distance by a tubular second part, which is embodied as an outer collar 18, with a hollow ring space 20 being formed. The ring space 20 is bounded toward the bottom by a base 24. A ring-shaped chamfer 22 widening toward the base 24 is formed at the transition from the inner collar 16 to the base 24. The inner collar 16 is arranged with the outer collar 18 and the hose 30 coaxially with respect to a central longitudinal axis 28 of the hose 30 and of the connector 12.

The hose 30 is pushed by the end to be connected to the connector 12 with its wall 32 over the inner collar 16 in the form of a press fit. In this case, the end side of the hose 30 butts against the chamfer 22, such that the end side 36 of the hose 30 forms a spacing with respect to the base 24 of the ring space 20. Before the hose 30 is inserted into the ring space 20, the latter is partly filled with a liquid adhesive 40. In this case, the quantity of the adhesive 40 and the viscosity thereof are chosen such that a small part of the adhesive 40 creeps into a first inner ring gap 216 between the wall 32 of the hose 30 and the outer wall of the inner collar 16, while the remaining quantity of the adhesive 40 fills the axial gap between the end side 36 of the hose 30 and the base 24 of the ring space 20 as well as the larger outer ring gap 218 between the outer lateral surface of the hose 30 and the inner side of the outer collar 18.

In this case, after the insertion of the hose 30, the adhesive boundary 42 of the adhesive 40 in the inner ring gap 216 lies just below the upper edge of the inner collar 16.

After the insertion of the hose 30, the adhesive boundary 44 of the adhesive 40 in the outer ring gap 218 lies just below the upper edge of the outer collar 18.

After the curing of the adhesive 40, the end of the hose 30 is fixed permanently securely and tightly with respect to the connector 12 by the connection of the hose 30 at its inner side, its end side and its outer side.

The embodiments shown in FIGS. 2 and 3, in a departure from the pictorial illustration, can likewise be formed with an inner collar 16 and an outer collar 18 in the manner as described above in conjunction with the first embodiment in accordance with FIG. 1.

In FIG. 2, the connector 12, in its upper region, is integrally provided with a connecting part 38, by means of which a radial ring-shaped groove 39 is formed on the outer sheath of the connector 12. Said groove 39 serves for fixing a sheathing 60 as indicated in the left-hand part of FIG. 2. The sheathing 60 has on its inner side a shaped part 62, which is embodied, for example, as an inwardly projecting shoulder and which engages into the groove 39. A sheathing 60 of the hose 30 is important particularly in those cases where it is absolutely necessary to prevent a fluid from emerging from the hose 30 even in the event of damage to the hose 30, where the temperature of the fluid has to be kept at a specific level and/or where a risk of explosion proceeding from the fluid has to be prevented. The hose 30 with the sheathing 60 as illustrated in FIGS. 1 to 3 is used, for example, as a heatable hose for a fuel line or for a urea conduit in a vehicle.

In the exemplary embodiment in accordance with FIG. 3, the connecting part 138 with a ring groove 139 provided thereon is embodied as a separate component and fixed to the outer circumference of the connector 12.

The fixing parts 38 and 138 in accordance with FIGS. 2 and 3, respectively, afford significantly stabler fixing for the outer sheathing 60 than is the case by means of the sealing element in EP 1 721 097 B1 cited in the introduction. The integral embodiment of the fixing part 38 or the separate embodiment of the fixing part 138 with subsequent fixing to the outer sheath of the connector 12 are also advantageous and protectable independently of the type of fixing of the hose 30 to the connector 12.

The invention claimed is:

1. A device comprising a fluid-conducting channel hose and a component, wherein the channel hose, at at least one end having an inner cross section, is arranged in a sealing manner over a first part of the component, said first part being provided with a bore for conveying the fluid further, and is fixed with respect to said component, wherein the component is additionally provided with a second part surrounding the first part, and the end of the channel hose is arranged in a ring space formed between the first part and the second part and is fixed by means of an adhesive at least partly filling the ring space, wherein the ring space has a base, on which there is formed at least one spacer with a ring-shaped chamfer widening toward the base forming a stop, spaced apart from the base, for the end of the channel hose, whereby the end of the channel hose is arranged in a manner spaced apart from the base arranged in the ring space between the first part and the second part, without being outwardly deformed by said ring-shaped chamfer, so that an end side of the channel hose that faces the base and an inner wall and an outer wall of the channel hose are concomitantly surrounded by the adhesive.

2. The device as claimed in claim 1, wherein the channel hose forms together with the first part a very narrow ring gap.

3. The device as claimed in claim 1, wherein the channel hose forms together with the second part a wide ring gap.

4. The device as claimed in claim 1, wherein the first part has a shorter axial length than the axial length of the second part.

5. The device as claimed in claim 1, wherein the quantity of the adhesive in the ring space, the viscosity of the adhesive and the gap width of the ring gap between the channel hose and the first part are dimensioned such that the adhesive boundary between the channel hose and the first part lies before the axial end of the first part.

6. The device as claimed in claim 1, wherein the quantity of the adhesive in the ring space, the viscosity of the adhesive and the gap width of the ring gap between the channel hose and the second part are dimensioned such that the adhesive boundary between the channel hose and the second part lies before the axial end of the second part.

7. The device as claimed in claim 1, wherein the component is formed by a connector serving for connection to at least one adjacent component.

8. The device as claimed in claim 7, wherein the adjacent component likewise has a fluid conducting passage.

9. The device as claimed in claim 7, wherein the adjacent component is formed by a sheathing surrounding the channel hose.

10. The device as claimed in claim 9, wherein the sheathing engages by a shaped part into a groove on a connecting part formed or fixed on the component.

11. The device as claimed in claim 1, wherein the channel hose is flexible.

12. The device as claimed in claim 1, wherein the channel hose is arranged in a press fit over a first part of the component.

13. A method for connecting a fluid-conducting channel hose to a component, wherein the channel hose, has at least one end having an inner cross section, is arranged in a sealing manner over a first part of the component, said first part being provided with a bore for conveying the fluid further, and is fixed with respect to said component, wherein the component is additionally provided with a second part surrounding the first part, and the end of the channel hose is inserted into a ring space formed between the first part and the second part, said ring space being at least partly filled with liquid adhesive, and is fixed in the inserted position by the curing of the adhesive, wherein said ring space has a base, on which there is formed at least one spacer having a ring-shaped chamfer widening toward the base and forming a stop for the end of the channel hose, whereby the end of the channel hose is arranged in a manner spaced apart from the base arranged in the ring space between the first part and the second part, without being outwardly deformed by said ring-shaped chamfer, such that an end side of the channel hose that faces the base and an inner wall and an outer wall of the channel hose are concomitantly surrounded by the adhesive.

14. The method as claimed in claim 13, wherein the channel hose is pushed onto the first part with a press fit, wherein the adhesive enters into a narrow ring gap between the channel hose and the first part only to an extent such that it does not come into contact with the inner cross section of the channel hose beyond the end of the first part.

15. The method as claimed in claim 13, wherein the channel hose is arranged in a press fit over a first part of the component.

* * * * *